March 11, 1969 R. L. ALDER 3,431,654
SIGNALLING ORIENTATION INDICATOR
Filed May 22, 1967 Sheet 1 of 5

INVENTOR.
ROBERT L. ALDER
BY C. G. Stallings
ATTORNEY

INVENTOR.
ROBERT L. ALDER
BY C. G. Stallings
ATTORNEY 3,431,654
SIGNALLING ORIENTATION INDICATOR
Robert L. Alder, Pasadena, Calif., assignor to Byron Jackson, Inc., Long Beach, Calif., a corporation of Delaware
Filed May 22, 1967, Ser. No. 640,221
U.S. Cl. 33—205    14 Claims
Int. Cl. E21b 47/02; E21 47/022

ABSTRACT OF THE DISCLOSURE

A signalling orientation indicator which includes a gravity responsive pendulum or ball engageable with angularly spaced stepped stops to control the number of drilling fluid signals produced as an indication of the angular disposition of the drill string relative to the low side of the well bore.

---

The present invention relates to signalling orientation indicating means, and more particularly to means adapted to be incorporated in an oil or other well drilling string and operable to produce pressure pulses in the stream of well drilling fluid indicative of the angular disposition or orientation of a well drilling string relative to the low side of the bore hole.

The invention involves the modification of such signalling drift indicators as are exemplified in United States Patents Nos. 2,435,934, granted Feb. 10, 1948, to F. M. Varney et al., and 2,762,132, issued Sept. 11, 1956, to J. A. Varney, 3,176,407 issued Apr. 6, 1965 to R. L. Alder et al. In these prior devices, pressure signals are produced in the stream of drilling fluid adjacent the drill bit and are detectable at the surface of the earth as in indication of the angle of the lower end of the drill string from vertical, such signals being generated in a number which is either directly or inversely related to the angularity of the drill string adjacent to the bit. In the present invention the signal producing means of these prior devices may be combined with gravity responsive means which cooperate with angularly and axially spaced stops, whereby the number of signals produced is indicative, not of angle relative to vertical, but the angular relationship of the drill string in respect of its axis, and more particularly in respect of the location of a known reference point on the drill string relative to the low side of the bore hole.

In the drilling of certain oil and other wells or boreholes at an angle to vertical, it sometimes becomes necessary to change the angle at which the drill stem is progressing. This is to say, if the well drilling program requires that the well proceed at an angle of 15° from vertical in a given direction for a given distance in order to arrive at a given depth and offset position relative to the surface equipment, then it sometimes is necessary to correct for deviation from the prescribed angle. As is well known this correction may be made by use of selected jet bit orifices or by whipstocking, for example.

In the case of jet bit drilling, it is possible to increase or decrease the angle of the hole being drilled by the use of a bit having a jet orifice on one side larger than the other jet orifices. For example, if a conventional tri-cone bit is provided with a jet orifice at one side of 3/4" diameter and two jet orifices at the other sides of 3/8" diameter, a cavity will be made in line with the larger jet orifice when the drill string remains stationary during circulation of drilling fluid through the bit orifices. When rotation of the drill string is resumed the bit will tend to move into the cavity thereby tending to change the angle at which the hole will progress. If such jetting of a cavity be accomplished on the low side of the hole, the result will be shifting of the direction of drilling toward vertical; and, conversely, if jetting of a cavity be accomplished at the high side of a hole, the result will be shifting of the direction of drilling further away from vertical. Intermediate corrections may also be accomplished.

In whipstocking the drill stem, a wedge-like device or shoe is located in the hole so that upon resumption of drilling the bit is caused to be deflected by the wedge to change the angle at which the drill progresses. Here again if the wedge is disposed at the low side of the hole, the angle of the hole will be increased; and, conversely, if the wedge is disposed at the high side of the hole the angle of the hole relative to vertical will be decreased. Other corrections may be made, as is well known, whereby to alter the direction in which the well bore is progressing.

Still another mode of deflecting or changing the angle or maintaining the desired angle of progression of well drilling operations involves the use of a deflector shoe made up as a part of the drill string and either hydraulically or spring biased laterally of the drill string which will alter the angle. If the shoe acts on the low side of the hole the angle of progression will either be increased or decreased, depending upon the nature of the particular deflection tool being employed; and similarly corrections can be made by causing the shoe to act on the high side of the hole.

In all of the above types of drilling operations it is notable that it is necessary to be able to locate the drill string in respect of the relative angular disposition or orientation about the axis of the drill of a reference point on the drill string, namely, the relationship in the hole of either the large jet orifice in jet drilling, the face of the wedge in whipstocking, or the deflection shoe in the case of a deflection tool. In this connection, it is common prectice to provide in a drill string at a stabilized location above the bit a magnetic reference point which can be detected by a so-called "single-shot" surveying tool adapted to make a record showing the compass orientation and inclniation of the hole. Such single shot tools are either dropped into or run into the drill string on a cable before the drill string is pulled from the well to enable changing bits or at other selected times so that the driller can more or less apply weight on the bit and vary rotational speed as may be necessary to maintain or modify the progression of the hole.

After determining that correction of the progression of the hole is desirable, it is necessary to run the drill string back into the hole if bit change has occurred and/or relatively orient the drill string to effect orientation of the larger jet orifice, whipstock, or deflection shoe as desired relative to the high or low side of the hole. The low side is exemplary and is employed to generically indicate either high or low side.

In view of the foregoing it is an object of the present invention to provide a tool or instrument adapted to be installed or incorporated in a drill string at a location adjacent the bit or a whipstock or deflection tool or the like requiring orientation within the hole, said tool or instrument being capable of producing signals transmittable to the earth's surface as an indication of the angular relationship or orientation of a reference point on the tool or in the drill string can be properly oriented in respect of the low side of the hole to enable effecting the desired correction or maintenance of the progression of the drill string.

In accomplishing the foregoing general objective, it is a further and more specific object to provide a signal producing instrument or tool with gravity responsive means operable to control operation of the instrument so that the latter will be productive of signals differing in number at different relative angular positions of the tool in respect of the low side of the hole, whereby the orientation of the tool relative to the low side may be adjusted and detected without requiring the running on wireline of a surveying tool or single shot to determine the angular position of the drill string.

Still further, an object, of one illustrative species of the invention, is to provide gravity responsive pendulum means in a signalling tool, said pendulum means being engageable with one or another of a series of progressively axially spaced and angularly flaring stops, whereby to establish the number of signals produced by the tool as a function of selective engagement of the pendulum with one or another of the stops as the pendulum moves axially therethrough, the pendulum hanging toward the low side of the hole and the stops being selectively in position to be engaged by the pendulum depending on the orientation of the stops relative to the low side of the hole.

Still another object of another illustrative species of the invention is to provide gravity responsive ball means in a signalling tool, said ball means being engageable with one or another of a series of progressively axially spaced and angularly extended stops, whereby to establish the number of signals produced by the tool as a function of selective engagement of the pendulum with one or another of the stops as the ball moves axially relative to the stops, the ball reposing at the low side of the tool at the low side of the hole, and the stops being selectively in position to be engaged by the ball depending upon the orientation of the stops relative to the low side of the hole.

In accomplishing the foregoing general and specific objects it is a further object to provide a gravity responsive means and cooperative axially and angularly spaced stops in combination with the components of a signal producing instrument of the type disclosed in the aforementioned prior patents, wherein a knob supported on a shaft extending from the instrument housing is urged upwardly through a series of axially spaced restrictions upon cessation of the pumping of drilling fluid downwardly through the drill string, the upward movement of the knob being limited to an extent directly or inversely related to the angular disposition of the instrument relative to the low side of the hole in response to the selective engagement of the gravity responsive means with one of the stops, so that upon resumption of the circulation of drilling fluid the fluid flow responsive knob will be forced downwardly through the restrictions causing the production of one fluid pressure pulse or signal at each restriction, the signals travelling in the stream of drilling fluid to the top of the well and being detectable or recordable as an indication of the angular disposition of the instrument in the bore hole in relation to the low side of the hole.

Drill pipe and drill collars are made up by right hand threads at the joints, and accordingly another object of the invention is to provide an instrument according to the preceding objectives which can be operated or adjusted as to its orientation in the hole in response to right hand rotation of the drill string only, thereby avoiding any tendency to loosen a pipe or drill collar joint.

Other objects and advantages of the invention will be hereinafter described and the novel features of the invention will be defined in the appended claims.

In the accompanying drawings:

FIG. 2b is a downward extension of FIG. 2a;

Figures 1, 3, 4:
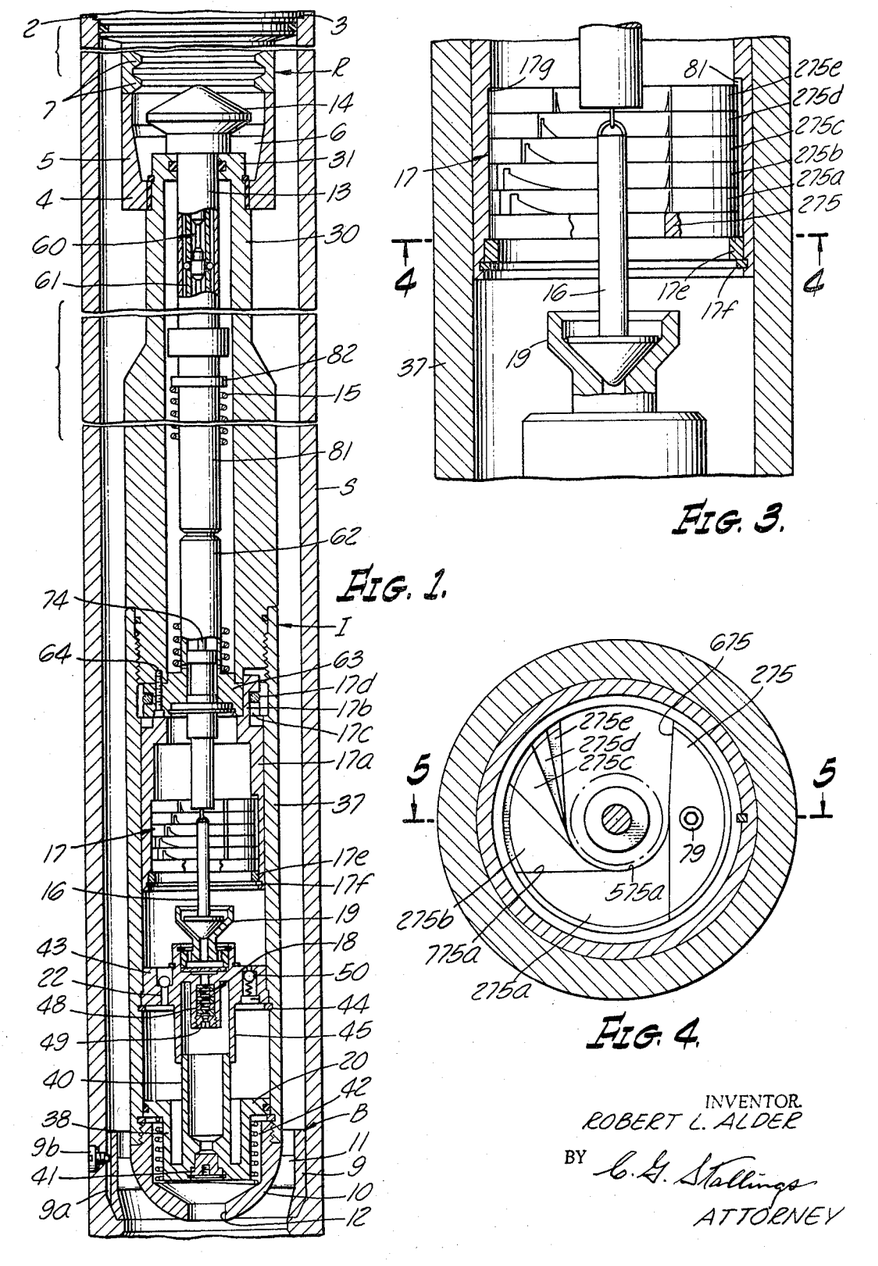
FIG. 1 is a fragmentary view partly in vertical section and with certain parts shown in elevation, illustrating an embodiment of an orientation instrument installed in a drill collar sub, the shaft being in its down position and the pendulum being on its seat.
FIG. 3 is an enlarged fragmentary detail view in vertical section, with parts in elevation, and more particularly illustrating the stop assembly and pendulum of the instrument of FIG. 1.
FIG. 4 is a view in transverse section as taken on the line 4—4 of FIG. 3.

Referring to FIG. 1, it will be seen that the signalling orientation indicator assembly of the invention is installed in a sub or length of drill collar S which is, as customary, adapted to be mounted in a string of drill pipe so as to conduct drilling fluid downwardly through the drill collar sub S to the bit, not shown, and the fluid then flowing upwardly outside of the drill string to the earth's surface. This assembly comprises an instrument housing generally denoted I having at its upper end a pulse ring sleeve R and at its lower end a bottom support B whereby the housing I is supported top and bottom in the sub S, and drilling fluid may flow through the sub S about the housing I.

In this connection, the pulse ring sleeve R has an enlarged end flange 2 which shoulders and is sealed in a seat 3. At its lower end the sleeve R is provided with a cylindrical member 4 connected to the sleeve by arms 5 providing windows or flow passages 6, so that fluid may pass through the sleeve R the member 4 mounting the sleeve R on the housing I. This mounting is preferably like that more specifically described in my copending application for United States Letters Patent, Ser. No. 561,637, filed June 29, 1966. Within the sleeve R it is provided with a series of axially spaced pulse rings 7, only two of a larger number being shown but each of which is adapted to cause a pressure pulse in the fluid stream passing therethrough, as will hereinafter appear. This pulse ring construction may be like that more specifically described in my copending application for United States Letters Patent, Ser. No. 552,150 filed May 23, 1966.

Bottom support B has an outer rim 9 and a hub 10 on which the rim 9 is supported by webs 11 forming therebetween flow passages at the lower end of housing I. A port 12 is provided in the hub 10 so that fluid finds access to the housing I at its lower end. The instrument I is maintained in a known orientation within the sub S by suitable means such as a keyway 9a in skirt 9 and a set screw 9b in sub S which is suitably sealed and extends into the keyway.

The housing at its upper end has reciprocably mounted therein and extensible therefrom a shaft 13 having at its outer extremity a head or knob 14. Within housing I is spring means 15 which normally biases shaft 13 upwardly out of the housing I, thereby causing the head 14 to be moved upwardly through the pulse rings 7. However, the flow of drilling fluid downwardly through the pulse ring sleeve R will cause the head 14 to move downwardly into engagement with the upper end of housing I. Thus, during circulation of drilling fluid the shaft 13 and knob 14 will remain as shown in FIG. 1, but when such circulation is halted, the shaft will be forced outward and the head will move upward through the ring 7. Such circulation of drilling fluid is automatically ceased each time an additional length of drill pipe is to be added at the earth's surface, and otherwise as desired. When circulation is resumed, a pressure pulse is caused as the knob 14 passes through the rings 7 due to the restriction in flow area, and such pulses are detectable at the earth's surface by a typical pressure gauge or pressure recorder.

In order that the upward movement of the shaft 13 will be limited in accordance with the angular disposition of the drill string about its axis, i.e., the orientation of the drill string relative to the low side of the hole being drilled, gravity responsive means, in this embodiment including a pendulum generally denoted at 16 is adapted to selectively engage pendulum stop means generally indicated 17 as the pendulum moves upwardly. In order to retard downward movement of the shaft 13, so that the resultant pressure pulses will be distinct and adequately spaced means generally indicated at 18 are provided for retarding fluid displacement through a pendulum seat 19. At the lower end of the housing I as a divider piston 20 shiftable to balance internal fluid pressure and external drilling fluid pressure, and so as to enable the transfer of fluid through the retarding means 18 as the shaft 13 displaces fluid downwardly, and the upward transfer of fluid through a check valve 22 as the shaft 13 is urged upwardly.

Figure 2A:
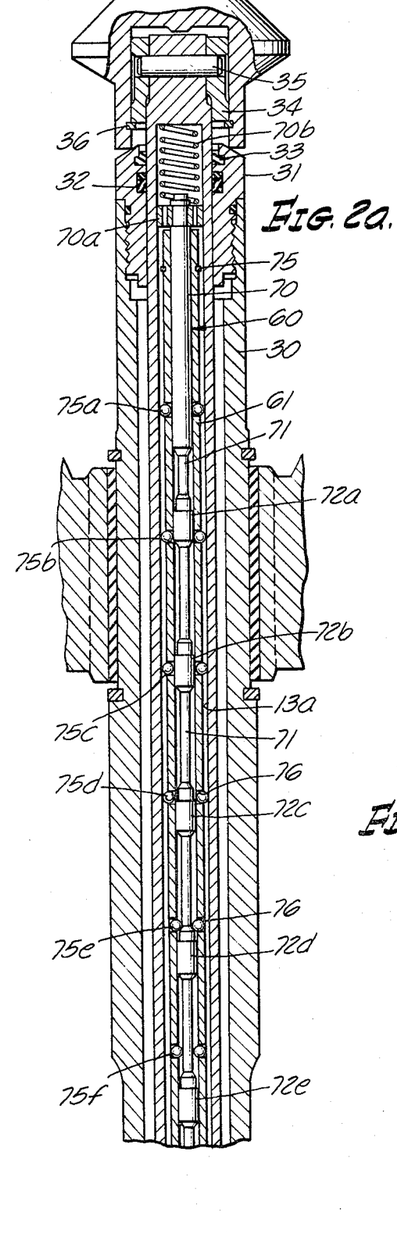
FIG. 2a is an enlarged fragmentary detail view in longitudinal section, showing the upper end of the instrument of FIG. 1, minus the pulse ring assembly, and showing the upper portion of the coding system.
Figure 2B:
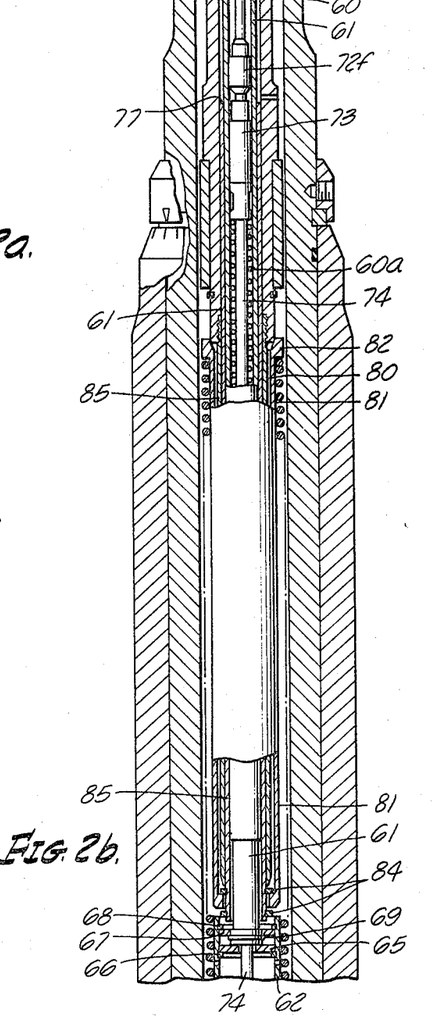

Referring to FIGS. 2a and 2b it will be seen that the instrument housing I includes an upper tubular section 30 having an upper shaft guide 31 threadedly mounted therein. Shaft guide 31 has a seal and wiper means 32 and 33, respectively, engageable with the shaft. At the outer extremity of the shaft, the knob 14 is supported by means of a knob bushing 34, a pin 35 connecting the bushing to the shaft, and a snap ring 36 for retaining the knob on the bushing.

As seen in FIG. 1, the upper housing section 30 is threaded to a lower housing section 37 to the lower end of which is connected the hub 10 of bottom support B. Within the lower housing section is the divider piston 20 which has a skirt 38 adapted to extend into the hub 10. In the skirt 38 is a hollow piston guide stem 40, at the lower end of which is a filler plug 41, whereby the housing may be filled with clean oil or the like. A spring 42 seated in hub 10 is provided to normally bias the piston 20 upward, but essentially the piston 20 serves to apply pressure to the internal fluid equal to external fluid pressure and to move axially to allow extension of the shaft 13 from the housing.

Disposed above the piston 20 in lower housing section 37 is an orifice block 43, retained in place by a lock ring 44 and having a downwardly extended guide tube 45 slidably receiving the guide stem 40 of the piston. Supported by block 43 and within guide tube 45 is an orifice disc assembly having a stack of orifice discs 48 retained in place by a ported plug 49. At one side of block 43 is the upwardly opening ball check valve 22 and at another location in the block 43 is a downwardly opening spring loaded relief valve 50. Thus, the orifice block 43, the valve 22 and the orifice discs 48 constitute the means 18 for retarding downward flow of housing fluid through the block 43, while enabling comparatively free upward flow of housing fluid, as the shaft is extended from the housing and forced back into the housing during operation of the instrument. The valve 50 serves to relieve pressure in the event that such relief may be necessary. The block 43 also supports the aforementioned pendulum seat 19. The pendulum 16 is adapted to seat in the pednulum seat 19 when the shaft 13 is in the downward position.

The shaft is connected to the pendulum by coding means which allow upward movement of the shaft a distance inversely related to the upward travel of the pendulum. The coding means includes, as seen in FIGS. 2a and 2b, a longitudinally extended coding rod generally indicated at 60 which is reciprocally disposed in a tubular guide and stop ball support 61. The guide 61 is connected to and essentially constitutes a portion of the upper housing section 30 and is supported at its lower end in a tubular part 62 which is formed as an upward extension of a block 63 which in turn is secured within the instrument at the lower end of the upper housing section 30 by means of a suitable number of fasteners 64 (see FIG. 1). More specifically, as seen in FIG. 2b, the guide 61 seats at its lower end on a washer 65 which shoulders at 66 in the upper end of the tube 62, and in upwardly spaced relation to the washer 65 is a second washer 67 fastened in the tube 62 by lock ring 68, the lower end of the guide 61 extending through washer 67 and having a lock ring 69 which engages beneath the washer 67. Thus it is apparent that while the guide 61 is assembled with the tube 62 prior to connection of the block 63 to the lower end of housing section 30, means are provided so that the ultimate assembling of these components results in the guide 61 being rigidly and concentrically supported within the upper housing section 30.

The coding rod 60 previously referred to is composed of an upper end section 70 slidably disposed within the guide 61. Beneath the upper end 70 is an axially spaced series of reduced stem sections 71 and thimbles 72a, 72b, 72c, 72d, 72e and 72f. Beneath the lowermost thimble 72f is a connector 73 which connects the upper coding rod section 70 to a lower coding rod section 74, the latter extending downwardly through the guide 61 and the guide supporting washers 65 and 67 into the tube 62. At its upper end, coding rod section 70 has a centralizing guide 70a secured thereto and slidably engaged in the shaft 13, this guide being perforated to permit bypass of fluid within the instrument. Above the guide 70a is a coil spring 70b freely disposed in shaft 13 so as to engage and bias the coding rod downward when the shaft is in its downward position, as shown in FIG. 2a. As shown in FIG. 2b, there is another coil spring 60a which surrounds the lower coding rod section 74 within rod guide 61 and engages at its upper end with connector 73 and which at its lower end engages the support washer 65 for tube 61. This spring 60a is adapted to normally bias the coding rod 60 upward when the shaft 13 moves upwardly. It is the purpose of the thimbles 72a–72f depending upon the extent of upward movement of the coding rod, as will be more fully explained hereinafter, to selectively hold in an outwardly projected position a set of stop projections which more specifically are composed of sets of balls. In the illustrative embodiment, there are 6 sets of such balls respectively designated from top to bottom, as viewed in FIGS. 2a, 75a, 75b, 75c, 75d, 75e, 75f, adapted to be moved outward by thimbles 72a–72f, respectively. The balls are disposed in openings 76 in the rod guide 61 so that the latter also constitutes a ball support. The sets of balls are cammed outward upon engagement by the respective thimbles 72a–72f into annular space 13a defined by the guide 61 and the shaft 13. Within the shaft 13 (see FIG. 2b) is a stop 77 which defines the bottom of the just-mentioned annular space 13a and essentially this stop forms a portion of the shaft 13 which will limit upward movement of the latter, under the influence of spring 15, upon engagement of the stop 77 with one of the sets of stop balls 75a–75f, or upon engagement of the stop 77 with a stop ring 75 carried by tube 61 in spaced relation above stop balls 75a, thus selectively limiting upward movement of the knob 14 with respect to the pulse ring section R.

Essentially the stop shoulder 77 is a portion of the shaft 13, but in the specifically shown structure the shaft 13 incorporates means for allowing freedom of upward movement of the shaft independently of the stop shoulder 77 in order to relieve the stop shoulder and stop balls from excessive loading, in the event of back flow of drilling fluid through the drill collar 3, as well as during running of the drill string into the well bore following the changing of drill bits. Accordingly, as shown in FIG. 2b, the shaft 13 is reduced in diameter at the point of its connection with a downwardly extended shaft extension 80. Concentrically disposed about the downward shaft extension 80 is a spring coupling sleeve 81 having an upper outwardly projecting flange 82 engaged by the upper end of the shaft biasing spring means 15. The lower end of the latter abutting, as shown in FIG. 1, with the block 63. The just-mentioned flange 82 also abuts with the larger diameter upper shaft section so that the shaft 13 is biased upwardly. At its lower end the spring coupling sleeve 81, as seen in FIG. 2b, is connected between a pair of snap rings 84 with an internal sleeve 85 which is disposed within the downward shaft extension 80. Thus it will be seen that the shaft extension 80 is free to move upwardly relative to the spring coupling sleeve 81 and the connected internal sleeve 85, but the spring means 15 acts to bias the shaft 13 upwardly through the intermediary of the spring coupling sleeve 81 and internal sleeve 85, the latter having at its upward extremity the above mentioned stop shoulder 77 (see FIG. 2b). Therefore, the extent of upward movement of the shaft 13 and the knob 14 under the influence of the spring means 15 is limited by the stop 77 even though the shaft may be free to move further upwardly in response to the influences of fluid flow through the drill collar 3.

Thus it will be apparent that if the balls 75f be cammed into the path of stop 77, the shaft 13 will be limited in its upward travel under the influence of spring 15 to a position at which the knob 14 is disposed between the lowermost and the next above pulse ring 7. As the shaft 13 is allowed further increments of upward movement then the knob 14 will correspondingly be allowed further upward movement, a distance equal to another pulse ring per increment of shaft movement. Thus if the stop 77 is allowed to pass all the sets of stop balls 75f through 75a but engages stop ring 75, the knob 14 will be allowed to travel a distance equal to the spaces between seven pulse rings as a result of which downward movement of the knob caused by drilling fluid flow will cause the production of seven pressure pulses or signals which will travel through the column of drilling fluid to the earth's surface for detection or recordation as an indication of the angle at which the housing 30 is disposed within the well bore. As previously described, the gravity responsive pendulum and the cooperative pendulum stop means 17, hereinafter to be described, serve to limit upward movement of the coding rod 60 so as to cause the projection of the appropriate set of stop balls 75a through 75f to limit upward movement of shaft 13.

It will be noted that the spacing of axial stop balls 75a–75f relative to the thimbles 72a–72f, as shown in FIG. 2a, is such that none of the stop balls will be projected outwardly into the path of shaft stop 77 when the coding rod has traveled upwardly the minimum extent, but the latch balls 75f will be projected outwardly into the path of stop 77 when the coding rod has traveled upwardly to the maximum extent. As a result the shaft will be allowed to move upwardly a minmum extent when balls 75f are projected outwardly and a maximum extent when none of the balls are projected outwardly. This inverse relationship as just described results in a direct relationship between extent of angular displacement of a reference point on the drill stem relative to the low side of the hole when the upward motion of the pendulum is arrested and the extent of upward travel of shaft 13. More particularly, there is a resultant direct relationship between the number of pulse rings through which the knob 14 will pass upwardly and the number of pressure signals produced when the knob is forced downwardly by the flow of drilling fluid and the orientation of the housing I relative to the low side of the hole. Therefore, in respect of each increment of angular displacement there will be produced one pressure signal.

It will be noted, as seen in FIG. 1 that the stop means 17 comprises a supporting sleeve 17a connected to the above-described block 63 by means of upstanding fingers 17b which extend into slots 17c which may be angularly spaced with respect to the fasteners 24 which connect the block 63 to housing 30. Fingers 17b have outwardly extended terminals adapted to abut with a lock ring 17d which extends about block 63 in a groove therein for interlocking the fingers with the block. Adjacent the bottom of sleeve 17a is a stop retainer 17e held in place by a snap ring 17f. Intermediate the retainer 17e and in opposing shoulder 17g in sleeve 17a is a series of stop members which are progressively axially spaced. In the illustrative embodiment there is an upper stop member 275e and progressing downwardly are stop shoulders 275d, 275c, 275b, 275a and 275. Thus, if upward movement of the pendulum 16 is arrested by stop shoulder 275a balls 75e will be caused to project into the path of stop shoulder 77 of the shaft 13. The same relationship exists between each of the stop shoulders 275 through 275d and ring 75 and balls 75a through 75d so that while the permitted upward travel of the pendulum 16 will be inversely related to the angular disposition of the instrument housing I about its axis relative to the low side of the hole the permitted upward travel of the coding rod 60 and hence the permitted upward travel of the shaft 13 will be directly related to the angular disposition of the housing and a single pressure signal will be induced in the drilling fluid stream for each detectable increment of angular displacement of a reference point on the drill string from the low side of the hole.

In the illustrative embodiment of the stop means 17 thus far described, the stop members are so constructed that they are selectively engageable by the pendulum by virtue of the fact that from bottom to top there is provided a series of progressively axially spaced and narrower angled slots through which the pendulum head may pass when the pendulum is hanging vertically and the transverse plane of the stops is inclined to the vertical.

These stop members are composed of a stack of disc like members having the slots therein. Thus, disc 275 comprises an annular ring 375 which seats on retainer 17e, and at a substantially chordal region is a rim 475 forming a seat for a stop element 575 having an edge 675 forming the lowermost stop shoulder. Above the stop member 275, the member 275a comprises a ring section 375a and a body section which is milled to form a wall 475a which is coplanar with the wall of subjacent stop-member forming shoulder 675. This wall merges with an arcuate rear slot wall 575a, the latter leading to a chordal wall 675a having a stop shoulder or edge 775a formed at the juncture of the wall 675a with the spherical under surface of the stop member 275a. Suitable fastening means such as a screw 79 may be provided for securing the member 575 to the more rigid unitary stop member 275a with the wall 475a in co-planar relation with the wall of member 575.

Figures 5, 6, 7:
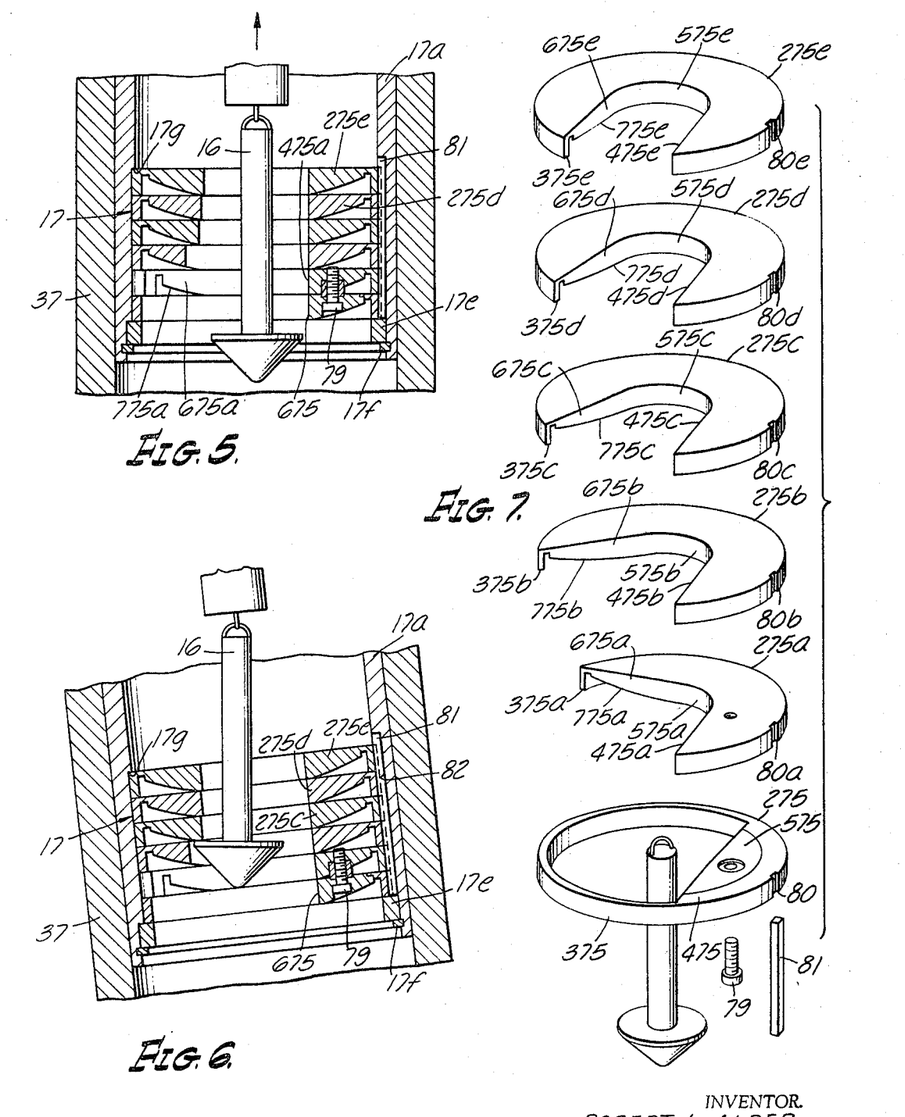
FIG. 5 is a view in vertical section as taken on the line 5—5 of FIG. 4, showing the stops so oriented about the axis of the assembly that the pendulum will not engage a stop as the pendulum moves upwardly.
FIG. 6 is a view corresponding to FIG. 5, but with the stops disposed at an angle relative to vertical and so oriented about the axis of the assembly as to cause coengagement of a stop by the pendulum as the same moves upwardly.
FIG. 7 is an exploded detail view in perspective showing the stops and pendulum of the instrument of FIG. 1.

Each successive stop member 275b–275e is constructed like member 275a, except for the difference in the angle formed by the opposing walls 475b–475e and 675b–675e, of the respective stop members, each of the stop members 275a–275e, having the arcuate walls 575a–575e joining the opposing slot walls, and each stop member 275a–275e having the stop edge or shoulder 775a–775e and a spherical undersurface as seen best in FIG. 5.

In order to properly position the stack of stop members 275–275e in the supporting sleeve 17e, each of the outer rims 375–375e is provided with a keyway 80–80e adapted to receive a key 81 which also engages in an elongated keyway 82 in sleeve 17a. This key is adapted moreover to orient the stop members and more particularly the slots or openings formed thereby in a known relation to the drill string or a reference point in such a fashion that when the instrument is assembled in the drill collar the slot opening defined by the stop members 275–275e will be preferably on a diametrical line coincident with a diametrical line extending through the reference point. For example, the tool may be assembled in such a manner that the slot opens laterally of the drill string on a diametrical center line which also intersects the large jet orifice of a jet bit, or the wedge face of a whipstock, or a deflection shoe, so that when the slot is disposed facing the low side of the hole, the jet orifice, whipstock, or deflection shoe will be disposed at the high side of the hole. It will be understood however, that such an assembly is merely illustrative, since when the relative angular position of the slot and the reference point are known it will enable a calculation of the actual orientation of the reference point relative to the low side of the hole, when the latter is detected.

Referring again to FIG. 4 it will now be seen that the progressively axially spaced stop shoulders or edges 775a–775e define with the coplanar walls 475a–475e and stop edge 675 a slot which becomes progressively narrower from bottom to top. Therefore the pendulum head will engage one of the stop shoulders 675 or 775a–775e depending upon the orientation of the tool about its axis in relation to the pendulum which depends vertically. Thus as seen in FIG. 5, the pendulum and slot being in alignment in the plane of the center of the slot of member 275e, the pendulum may pass upwardly through the entire stack of stop members provided the slot is facing the low side of the bore hole. Under these circumstances, as previously, described, since through coding rod 60 and stop balls 75a–75f and stop ring 75 and thimbles 72a–72f, the upward travel of shaft 13 will be inversely related to the extent of pendulum movement and thus the shaft will move knob 14 upwardly through one pulse ring 7 to produce one pulse, responsive to cessation of drilling fluid circulation and resumption of such circulation.

On the other hand if the pendulum and stop elements are aligned as shown in FIG. 5, but the slot is facing the high side of the hole, the pendulum head will pass upwardly until it engages the stop edge at the bottom of arcuate wall 575a of stop member 275a; and thus the knob 14 on shaft 13 will move upwardly under control of the coding means through six pulse rings 7 to produce six signals when fluid circulation is resumed. Thus six signals may be assumed as indicating at the earth's surface that the reference point on the drill string is 180° or less out of line with the low side of the hole, in a counterclockwise direction since the stop edge 775a of stop member 275 extends at an angle of about 90° to the diametrical center through the slot. If the reference point on the drill string were between 180° and slightly less than 360° out of alignment with the low side of the hole in a clockwise direction, the pendulum will engage the lowermost stop edge 675 of stop 275 which would result in the knob moving upwardly to the maximum extent, that is, through 7 pulse rings.

From the foregoing, it will now be apparent that the stop edges 775b–775e are disposed at increments of angle relative to the successive subjacent stop edge that the slot is progressively narrower. For example the angle of the slot of member 275a being 90° as indicated above, the angle of the slot of member 275b may be 45°; the angle of the slot of member 275c may be 22°; the angle of the slot of member 275d may be 11°; and the angle of the slot of member 275e may be 2½°. It will also be appreciated that the lower stop edge 675 of member 275 should diverge slightly with respect to the diametrical center of the slot, say at an angle of 2½° so as to allow for tolerance with the knob head. Under these circumstances the following readout of signals would be indicative of the following orientation of the reference point on the drill string, if the reference point be at the side of the drill string faced by the slot:

Signals: Reference point relative to low side of hole
1 ____ Within + or −2½°.
2 ____ Within + or −2½° to 11° counterclockwise.
3 ____ Within + or −11° to 22° counterclockwise.
4 ____ Within + or −22° to 45° counterclockwise.
5 ____ Within + or −45° to 90° counterclockwise.
6 ____ Within + or −90° to 180° counterclockwise.
7 ____ Within + or −180° to 360° counterclockwise.

Thus, correction of the relative orientation of the reference point on the drill string relative to the low side of the hole can be made by turning the drill string in a clockwise direction and obtaining a new signal reading until only one signal is received.

Referring now to FIGS. 8 through 12 a modified construction is illustrated wherein the gravity responsive means includes in lieu of the pendulum 16 a ball 116, and the stop means 17 comprises a plurality of angularly and axially spaced steps respectively designated 1275, 1275a, 1275b, 1275c, 1275d, and 1275e. In this modified construction the stop means 17 also includes the supporting sleeve 17a, as in the previously rescribed embodiment, which is connected to the block 63 by upstanding fingers 17b which extend into slots 17c in the upper housing 30. Likewise at the lower end of the sleeve 17a is a retainer 17e secured within the lower end of the sleeve by lock rings 17f. Disposed above the retainer 17e is a tubular guide member 117 having a fluid passage 118 therethrough, this member 117 being sealed about its outer periphery at 119 and having a central bore 120 open at its lower end through an opening 121 in the retainer 117e to the housing fluid just above the fluid transfer restricting means 18 as described in relation to the previous embodiment. Within the passageway 118 is a suitable filter 122 for a purpose which will hereinafter be apparent. At its upper end the passage 118 opens in an annular groove which lies between a pair of opposing faces 123 forming an annular race for the ball 116.

Figures 8, 9, 10:
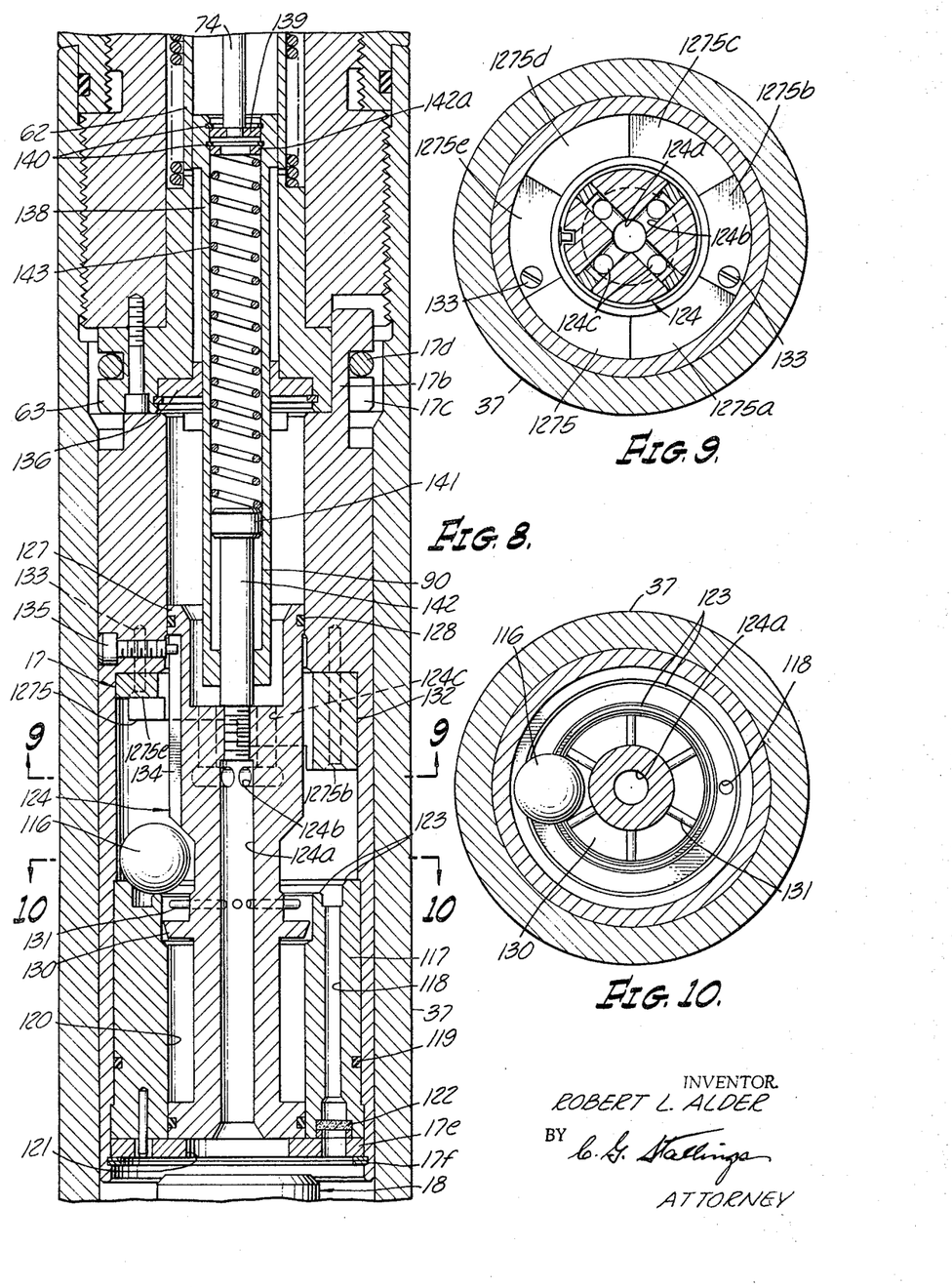
FIG. 8 is a fragmentary view in longitudinal section illustrating another embodiment of a gravity responsive means and stops useful in the instrument of FIG. 1, including a ball in the position it would assume when the knob and shaft of FIG. 1 are in the full down position.
FIG. 9 is a transverse sectional view as taken on the line 9—9 of FIG. 8.
FIG. 10 is a transverse sectional view as taken on the line 10—10 of FIG. 8.
Figures 11, 12:
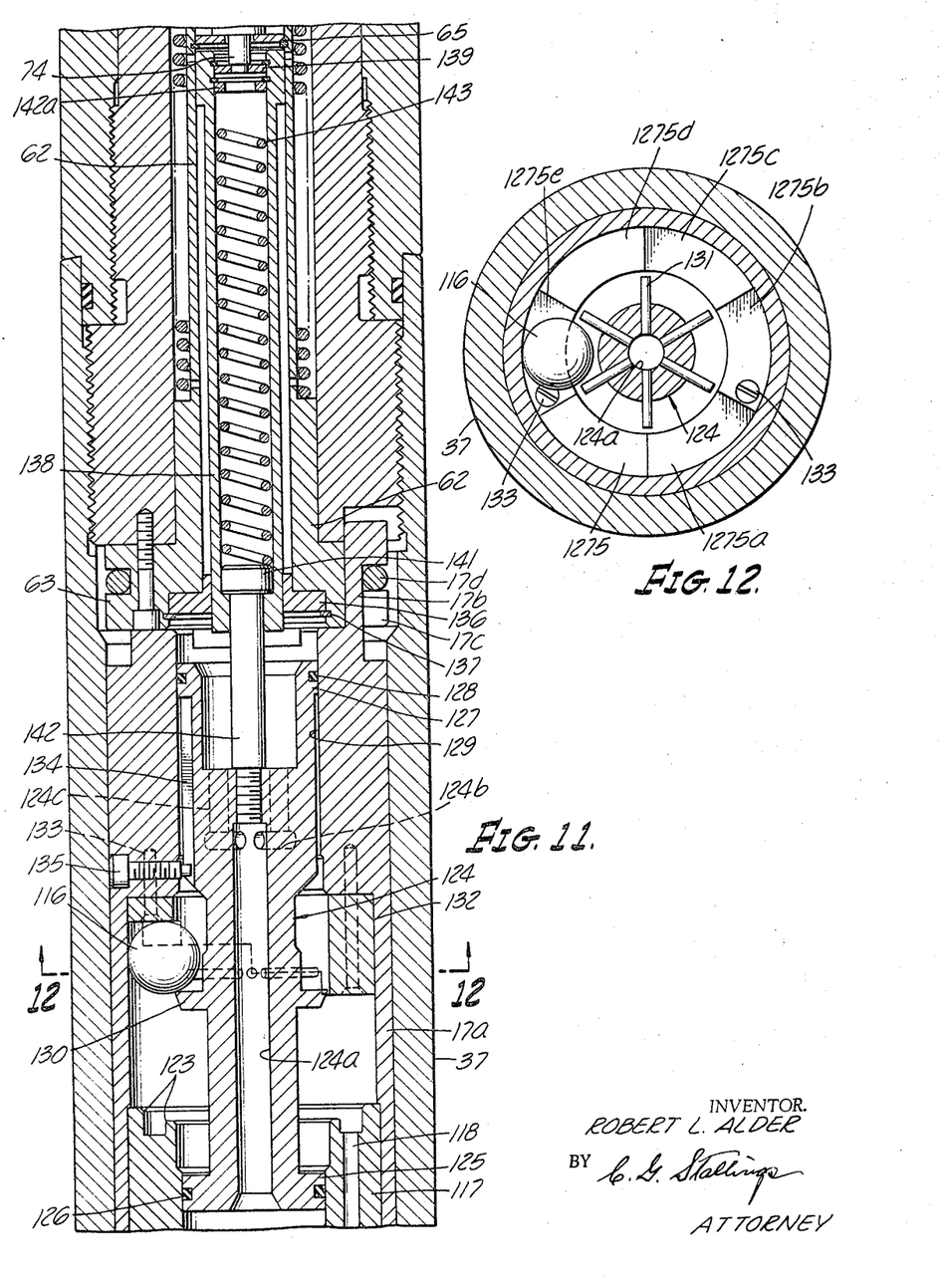
FIG. 11 is a view corresponding to FIG. 9, but showing the gravity responsive ball engaged with the highest stop, as when the ball is on a diametrical line extended from the high to the low side of the instrument.
FIG. 12 is a view in transverse section as taken on the line 12—12 of FIG. 11.

Ordinarily, the ball will rest on the ball race 123, and means are provided for lifting the ball from the race and moving the ball into engagement with selected one of stops 1275–1275e, depending upon the orientation of the assembly in relation to low side of the hole. It will be understood in this connection that when the drill collar sub in which the instrument is mounted is disposed at an angle to the vertical, then the ball 116 will at all times rest at the low side of the race 123. Therefore when the ball 116 is lifted it will engage the above mentioned stop or shoulder which is also at the low side of the hole. The ball lifter comprises an elongated member generally denoted at 124 which has a lower guide 125 slidably disposed in the bore 120 of the member 117, there being a seal at 126 between the lower guide 125 and the wall of the bore 120. The ball lifter 124 also includes an upper guide 127 having a seal 128 slidably engaging the wall of a bore 129 in the upper portion of the stop support sleeve 17a.

Further the ball lifter 124 includes between its ends an outwardly projecting flange 130 which when the lifter is in its lower position will be disposed below the ball race as shown in FIG. 8, but which upon upward movement of the ball lifter, as shown in FIG. 11, will engage and move ball 116 upwardly until the latter engages one of the stepped stops 1275–1275e. Located above the lifter flange or upward projection 130 is a number of circumferentially spaced fingers 131 which lie on a common radial plane respectively with one of the steps. In other words, the arms 131 lie on the plane of the risers between steps and function to normally maintain the ball 116 in a position such as that shown in FIGS. 10 and 12, so that it will engage one of the stops substantially in its middle.

The stops or steps 127S–127Se are formed upon a member 132 which is secured within the support sleeve 17a as by suitable fasteners 133 which, as best seen in FIGS. 9 and 12, extend through the steps to one side of the center of the steps and into the support sleeve 117a. The relative orientation between the lifter 124 and the stops is maintained by a key way 134 in the upper guide section 127 of the ball lifter and the inner extremity of a key or screw 135 mounted within the support sleeve 17a and extending into the keyway.

Means are provided for connecting the ball lifter 124 to the coding rod of the assembly, as previously described, and more particularly to the lower end 74 thereof, so that as the shaft 13 moves upwardly upon interruption of the downward flow of drilling fluid, the coding rod 60 will be limited in its upward movement to a position determined by engagement of the ball 116 with one of the stops 127S–127Se, so as to cause one of the thimbles 72a–72f to engage with and move outwardly certain of the stop balls 75a–75f, whereby to limit upward movement of the shaft upon engagement of stop 77 with either one of the balls 75a–75b or with the upper stop ring 75, as previously described, to an extent inversely related to the permitted upward travel of the ball lifter 124.

In this connection it will be noted that the tubular member or guide 62 of the first described embodiment is in the embodiment now being described provided internally with a guide bushing 136 at its lower end retained in place by the snap ring 137. Shiftably disposed in the guide bushing 136 is an elongated tubular spring housing 138, to the upper end of which is connected the rod 74 which depends upon the coding rod, previously described. The rod 74 is connected to a washer 139 which is in turn retained within the upper extremity of the spring housing 138 by a pair of spaced retainer rings 140. The upper end of the elongated spring housing 138 is slidably disposed within the tubular guide 62 and at its lower end, spring housing 138 receives an enlarged head 141 of a connector member 142 which is threadedly engaged or otherwise suitably connected to the upper end of the ball lifter 124. Within the spring housing 138 is a coiled compression spring 143 which when the ball lifter is in the down position as shown in FIG. 8 is compressed between the upper end of the connector 142 and a washer 142a disposed beneath the lowermost retainer ring 140 at the upper end of the spring housing 138. Thus the spring 143 when the shaft and knob 14 are in the down position as shown in FIG. 1 will impose a spring force on the ball lifter 124 to hold the latter in its lowermost position as shown in FIG. 8. However, when upon the cessation of circulation of drilling fluid the knob and shaft of the instrument move upward, the spring housing 138 may move upwardly under the influence of spring 143 and under the influence of coding rod lift spring 60a a limited distance before an upward pull is imposed on the ball lifter 124. Thereafter, as the ball lifter 124 moves upwardly from the position shown in FIG. 8 to the position shown in FIG. 11 the lifter flange 130 engaging ball 116 will carry the latter into engagement with whichever of the stop shoulders 127S–127Se is disposed at the low side of the hole. The coding rod will accordingly be positioned as previously indicated to control the ultimate upward movement of the knob 14, and a number of pressure signals or pulses will be generated as the knob moves downwardly in response to resumption of the downward flow of drilling fluid.

Inasmuch as for illustrative purposes the stops of the embodiment now being described have been shown as comprising six steps, each of 60°, it will be appreciated that the signals produced upon resumption of drilling fluid flow will indicate at the surface that a reference point on the drilling string, for example the large jet orifice of a jet bit, is in a given angular disposition relative to the low side of the hole within plus or minus 30° from the actual angular disposition. However, if greater accuracy is desired then it would only be necessary to employ steps of lesser angular extent.

Thus as in the case of the first described embodiment of the present invention in the utility of the embodiment of FIGS. 8 through 12 it will be recognized that when circulation of drilling fluid has been arrested the ball lifter 124 will raise the ball 116 into engagement with one of the stops, and assuming that, as shown in FIGS. 11 and 12, the ball 166 engages the stop 127Se signals will be produced which will indicate that the ball has moved upwardly to the maximum permitted extent. Due to the coding system of the instrument, as previously described, there will be produced under these circumstances a single pressure surge or signal which may be indicative that the reference point on the drill string lies on a diametrical line intersecting the ball and the stop 127Se, but if more than one signal is received then by rotation of the drill string and the taking of a further reading of signals the desired orientation of the tool may be achieved.

It will be noted that the ball lifter 124 is provided with a central passageway 124a and adjacent the upper end of the passage 124a is a number of radial passages 124b which communicate with axial passages 124c so that fluid within the instrument housing is free to bypass the ball lifter 124 to maintain an internal/external fluid pressure balance. However, it will also be noted that the fluid which is disposed between the seal rings 126 and 128 on the lower ball lifter guide 125 and the upper ball lifter guide 127, respectively, define a chamber exteriorly of the ball lifter, access to which is by way of the passage 118 through the member 117. This passage includes the filter 122 so that all fluid in the region of the race 123 for the ball 116 is filtered as it enters the space in which the ball is operative. Therefore, it is impossible for particles of the tool or dirt particles to find access to the race so as to interfere with the ball's seeking the low point of the hole when the angle is slight.

While the specific details of the two illustrative embodiments of the invention have been herein shown and described changes and alterations may be resorted to without departing from the spirit of the invention.

I claim:

1. In a signalling apparatus adapted to be installed in a well drilling string for producing pressure pulse signals in a stream of drilling fluid indicative of the disposition of the drilling string, said apparatus comprising: a tubular body adapted to be installed in the drilling string, signalling means in said body for producing pressure pulses following interruption of the flow of drilling fluid and responsive to the resumption of the flow of drilling fluid, said signalling means including a member moveable in one direction upon interruption of the flow of drilling fluid and moveable in the other direction upon resumption of the flow of drilling fluid, means cooperative with said member for producing said pressure pulses in a number depending upon the extent of movement of said member, and gravity responsive means operable to determine the extent of movement of said member when the flow of drilling fluid is interrupted, the improvement wherein said gravity responsive means includes a gravity responsive element and a plurality of axially and angularly spaced stops selectively engageable by said gravity responsive element for controlling said signalling means to produce pressure pulses in a number indicative of the orientation of said drill string with respect to the well.

2. Signalling apparatus as defined in claim 1, wherein said axially spaced stops are angularly spaced in relation to a known reference point on the drilling string.

3. Signalling apparatus as defined in claim 2, wherein said gravity responsive means includes a pendulum moveable axially relative to said stops upon said movements of said member, and said stops define a slot opening laterally in a known relationship to said reference point on said drilling string and in which said pendulum is disposed for selective engagement with one of said stops when the slot is angularly displaced from the low side of the drilling string.

4. Signalling apparatus as defined in claim 2, wherein said gravity responsive means includes a pendulum moveable axially relative to said stops upon said movements of said member, and said stops define a slot opening laterally in a known relationship to said reference point on said drilling string and in which said pendulum is disposed for selective engagement with one of said stops when the slot is angularly displaced from the low side of the drilling string, said stop edge of successive stops being disposed at successively larger angles relative to the central plane of said slot.

5. Signalling apparatus as defined in claim 1, wherein said gravity responsive means includes a pendulum moveable axially relative to said stops upon said movements of said member, and said stops include elements defining a slot opening laterally, each element having a face provided with a stop edge at one side of said slot, and the rest of said stop elements having faces provided with stop edges at the other side of said slot and successively disposed at wider angles relative to the central plane of said slot, said pendulum having a head provided with a stop shoulder engageable with said edges.

6. Signalling apparatus as defined in claim 5, wherein the faces and stop edges of said rest of said stop elements each merge with an arcuate face forming the base of said slot, and said head of said pendulum being complemental to said arcuate base.

7. Signalling apparatus as defined in claim 5, wherein said rest of said stop elements have spherical surfaces extended outwardly from said slot and providing space for said pendulum head to enable engagement of said shoulder on said head with said edges, said spherical surfaces being on the same radius as the radius of arcuate movement of said shoulder on said head.

8. Signalling apparatus as defined in claim 2, wherein said gravity responsive means includes an element moveable axially relative to said stops upon said movements of said member, said element having a ball race, and a ball engaging said race and moveable to the low side of said drilling string for engagement with the stop at the low side of said drilling string.

9. Signalling apparatus as defined in claim 2, wherein said gravity responsive means includes an element moveable axially relative to said stops upon said movements of said member, said element having a ball race, and a ball engaging said race and moveable to the low side of said drilling string for engagement with the stop at the low side of said drilling string, said stops including a series of angularly spaced steps of progressively greater axial extent.

10. Signalling apparatus as defined in claim 2, wherein said gravity responsive means includes an element moveable axially relative to said stops upon said movements of said member, said element having a ball race, and a ball engaging said race and moveable to the low side of said drilling string for engagement with the stop at the low side of said drilling string, said stops including a series of angularly spaced steps of progressively greater axial extent, said steps including axially extended risers disposed on radial planes about said element, and said element having fingers extended radially therefrom in the planes of said risers to hold said ball centrally of the respective steps.

11. Signalling apparatus as defined in claim 1, wherein said signalling means includes a housing in said tubular body, said housing being filled with clean fluid and having means for maintaining a pressure balance between the drilling fluid and said clean fluid.

12. Signalling apparatus as defined in claim 1, wherein said signalling means includes a housing in said tubular body, said housing being filled with clean fluid and having means for maintaining a pressure balance between the drilling fluid and said clean fluid, said gravity responsive means including an element in said housing movable axially upon said movements of said member and having a ball race, a ball engaged with said race and moveable thereon to the low side of the drilling string, said element and said housing having means forming seals at opposite sides of said race and forming a chamber externally of said element, said element having fluid passage means extended therethrough for passage of said clean fluid through said element to opposite sides of said chamber, and said element having a passage leading from said housing into said chamber, said latter passage having a filter for filtering the fluid in said chamber.

13. Signalling apparatus as defined in claim 1, wherein said signalling means include a housing disposed in said tubular body, said moveable member including a shaft projecting from said housing and moveable outwardly upon interruption of the flow of drilling fluid and inwardly upon resumption of the flow of drilling fluid, pulse producing restrictions in said body in axially spaced relation, and a knob on said shaft moveable through a number of said restrictions depending upon the extent of movement of said shaft.

14. Signalling apparatus as defined in claim 13, wherein means are provided between said gravity responsive means and said shaft for limiting movement of said shaft to an extent inversely related to the movement of said gravity responsive means.

References Cited

UNITED STATES PATENTS

| | | |
|---|---|---|
| 3,176,407 | 4/1965 | Alder et al. |
| 2,762,132 | 9/1956 | Varney. |
| 2,435,934 | 9/1948 | Varney et al. |

LEONARD FORMAN, *Primary Examiner.*

F. J. D'AMBROSIO, *Assistant Examiner.*